US005759947A

United States Patent [19]
Zhou

[11] Patent Number: 5,759,947
[45] Date of Patent: Jun. 2, 1998

[54] BIFUNCTIONAL CATALYST CONTAINING MULTIMETAL OXIDES

[76] Inventor: Hongxing Zhou, 5-504, Lixinhongwulou, Sanjianrendasushe, Haidian District, Beijing 100080, China

[21] Appl. No.: 586,913

[22] Filed: Mar. 18, 1996

[30] Foreign Application Priority Data

Jul. 29, 1993 [CN] China ............................ 93 109023.7

[51] Int. Cl.$^6$ ............................ B01J 23/00; B01J 23/32; B01J 23/72; B01J 23/42
[52] U.S. Cl. ............................ 502/324; 502/302; 502/303; 502/304; 502/312; 502/315; 502/316; 502/318; 502/319; 502/324; 502/331; 502/337; 502/338; 502/339; 502/350
[58] Field of Search ............................ 502/302, 308, 502/303, 304, 305, 312, 315, 316, 318, 319, 324, 325, 330, 331, 337–339, 345, 349, 350

[56] References Cited

U.S. PATENT DOCUMENTS

| | | | |
|---|---|---|---|
| 3,839,224 | 10/1974 | Yonehara et al. | 502/66 |
| 3,846,340 | 11/1974 | Okuyama et al. | 252/455 R |
| 3,865,923 | 2/1975 | Stephens | 423/213.2 |
| 4,003,854 | 1/1977 | Skvortsov et al. | 502/324 |
| 4,088,193 | 5/1978 | Nakajima et al. | 423/239.1 |
| 4,639,431 | 1/1987 | Gates et al. | 502/304 |
| 4,657,885 | 4/1987 | Fiato et al. | 502/241 |
| 4,719,240 | 1/1988 | Fiato et al. | 518/717 |
| 5,008,090 | 4/1991 | Joy, III et al. | 423/212 |
| 5,047,379 | 9/1991 | Alyea et al. | 502/353 |
| 5,182,249 | 1/1993 | Wang et al. | 502/303 |
| 5,283,041 | 2/1994 | Nguyen et al. | 423/240 S |

FOREIGN PATENT DOCUMENTS 0530734  3/1993  European Pat. Off.

*Primary Examiner*—Elizabeth D. Wood
*Assistant Examiner*—Patricia L. Hailey
*Attorney, Agent, or Firm*—Watson Cole Stevens Davis, P.L.L.C.

[57] ABSTRACT

A bifunctional catalyst containing multimetal oxides, and a method for preparing the same, includes a support of a moulded mixture of silica and alumina in a weight ratio of 1:1.2–2.5, and upon the support is deposited 3–30% by weight of metal oxides based on the total weight of the catalyst. The metal elements of the metal oxides are at least two selected from transition metal of period 4 of the periodic table and lanthanide. The metal oxides of the catalyst exist in the state of non-composite oxides.

15 Claims, No Drawings

BIFUNCTIONAL CATALYST CONTAINING MULTIMETAL OXIDES

FIELD OF THE INVENTION

This invention relates to a kind of catalyst, especially a catalyst with metal oxides as active components.

BACKGROUND OF THE INVENTION

Recently, catalytic techniques have been extensively used in many countries in the processes of chemical oxidation and reduction involved in the petrochemical industry, chemical industry, environmental protection and treatment of industrial waste gas. However, the active components in these catalysts are mainly nobel metals such as platinum, ruthenium, rhodium and palladium, etc. Therefore it is an important research subject in catalysis to find cheap materials with abundant reserve in place of the expensive and rare nobel metals (such as platinum).

In the 1970's, people began to make attempts to use composite oxides of rare earths as active components in catalysts. The characters of these composite oxides, such as special electromagnetic properties, high temperature tolerance and good catalytic oxidative ability, have drawn extensive attention for many years. $La_{1-x}Sr_xCoO_3$, for example, was found to have very high activity for the oxidation of propane, methane and carbon monoxide (T. Nakamura, M. Misono et al., Nippon Kagaku, Kaishi 1980,1679). It was also proposed in the early 1970's to use composite oxides of rare earths in place of platinum in the catalyst for cleaning automobile exhaust gas [R. J. H. Voorhoeve, Science, 177, 353(1972)].

Although, until now, many catalysts have been disclosed in which composite oxides were used as active components in place of nobel metals, some problems such as the long-term stability and completeness of the structure of the composite oxides under the practical conditions still have not been solved. Therefore, this kind of catalytic material has not been well applied. Research on replacing nobel metals used as active components in catalysts with composite oxides is still in the test stage. No ideal results have been attained yet.

SUMMARY OF THE INVENTION

The object of the invention is to provide a catalyst containing multimetal oxides as active components. This catalyst has good properties. It can completely oxidize various organic compounds such as carbon monoxide, alkanes, alkenes and aromatic hydrocarbons, etc., and decompose nitrogen oxides and sulfur oxides.

Another object of the invention is to provide a method of preparing such a catalyst and to provide products prepared by this method.

The object of the invention are realized through the following technical schemes.

This invention provides a bifuntional catalyst containing multi-metal oxides. The term "bifunctional" means that this kind of catalyst can be used not only as an oxidative catalyst but also a reductive one. This catalyst is prepared by depositing metal oxides, the amount of which is 3–30 wt.%, preferably 5–20 wt.%, more preferably 8–15 wt.% of the total weight of the catalyst, onto the outer and/or inner surface of the moulded support. The support is treated by the steps of calcining at 1000° C.–1600° C. for 2–8 hours in an oxidative atmosphere, treating the calcined support in a 0.3–2M solution by a nitrate or acetate of a metal element selected from transition metals of period 4 and lanthanides, and then calcining the support at 700°–1200° C. for 1–4 hours in a reductive atmosphere. At least two of the metal elements, the number of which is usually 2–5, are selected from transition metals of period 4 of the periodic table and lanthanides. The metal oxides in the catalyst do not exist in the state of composite oxides.

In particular, the selected metal oxides can be oxides of chromium, oxides of manganese, oxides of iron, oxides of copper, oxides of cobalt, oxides of nickel, oxides of zinc, oxides of vanadium, oxides of titanium, oxides of lanthanum and oxides of cerium.

The support can be in a shape of microspheric powder with particle size of 60–100 μm or in a shape of cylinder, ring, sphere, plate with particle diameter of 3–5 mm or honeycomb.

The bifunctional catalyst containing multimetal oxides according to the present invention is prepared by the following method comprising the steps of:

1) mixing silica and alumina which are used as supports in a weight ratio of 1:1.2–2.5, moulding and calcining at 1000°–1600° C. for 2–8 hours in an oxidative atmosphere;

2) dissolving a nitrate or acetate of one element selected from transition metals of period 4 of the periodic table and lanthanides to prepare a 0.3–2M solution and treating the calcined support b using the solution;

3) calcining the support treated in step 2) at 700°–1200° C. for 1–4 hours in a reductive atmosphere;

4) mixing nitrates or acetates of at lease two transition elements selected from the periodic group 4 and lanthanides to form a solution in which the total concentration of metal ions is 1–2.5M, and adding a coordination agent selected from oxalic acid, amino acetic acid, 2-hydroxy-propanoic acid, succinic acid, hydroxy-butanedioic acid, tartaric acid, citric acid, o-phthalic acid, o-amino-benzoic acid and salicylaldoxime into the above solution in an amount of the added coordination agent being ¼–¾ of the total concentration of the metal ions to prepare the impregnant;

5) impregnating the support prepared by step 3), then drying and activating at a temperature of about 300° C. to obtain the bifunctional catalyst containing multimetal oxides.

The noted transition metals of period 4 and lanthanides are selected from chromium, manganese, iron, copper, cobalt, nickel, zinc, vanadium, titanium, lanthanum and cerium.

In step 1), the support can be moulded into microspheric powders with particle size of 60–100 μm or cylinder-, ring-, spherical-, plate particles with diameter of 3–5 mm or honeycomb-shaped.

When preparing the impregnant, the mixed solution of manganese nitrate, cobalt nitrate and cerium nitrate can be selected. The total concentration of the metal ions is 1–2.5M and the molar ratio of various metal ions is 1:1:0.3–0.5 and the coordination agent is added.

Or the mixed solution of copper nitrate, chromium nitrate and cerium nitrate can also be selected. The total concentration of the metal ions is 1–2.5M and the molar ratio of various metal ions is 1:1:0.3–0.5 and the coordination agent is added.

Or the mixed solution of copper nitrate and chromium nitrate can also be selected. The total concentration of metal ions is 1–2.5M and the molar ratio of various metal ions is 1:1–2.

Or the mixed solution of nickel nitrate, cobalt nitrate, cerium nitrate, chromium nitrate can also be selected. The total concentration of metal ions is 1–2.5M and the molar ratio of various metals is 0.5:2.9:3:3.8 and the coordination agent is added.

Or the mixed solution of iron nitrate, copper nitrate, cobalt nitrate, cerium nitrate and chromium nitrate can also be selected. The total concentration of metal ions is 1–2.5M and the molar ratio of various metal ions is 1.3:2:2.7:3:4 and the coordination agent is added.

Or the mixed solution of nickel nitrate, manganese nitrate, copper nitrate, cerium nitrate and chromium nitrate can also be selected. The total concentration of metal ions is 1–2.5M and the molar ratio of various metal ions is 1:2–4.7:2.3:3:2–4.7 and the coordination agent is added.

Or the mixed solution of nickel nitrate, cobalt nitrate, copper nitrate, cerium nitrate and chromium nitrate can also be selected. The total concentration of metal ions is 1–2.5M and the molar ratio of various metal ions is 1:2:2.3:3:4.7.

Or the mixed solution of cobalt acetate, manganese acetate and lanthanum acetate can also be selected. The total concentration of metal ions is 1–2.5M and the molar ratio of various metals is 1:1:0.04 and the coordination agent is added.

The coordination agent added in the mixed solution is preferably citric acid.

The impregnation in step 5) can be operated at normal pressure or in vacuum.

The number of metal elements in the mixed solution is generally 2–5.

A detailed explanation of this invention now follows.

The catalyst according to the present invention is obtained by depositing the amorphous oxides of active metals on a support consisting of silica and alumina. During many years of study of various composite metal oxides and metal oxides, we have realized that metal elements from period 4 and lanthanides are the components that consist of amorphous metal oxides with high activity.

Besides, the special preparation procedures of this invention can make the active components distribute on the support firmly and uniformly, while avoiding forming bulk compounds with support so that the long term stability and completeness of the prepared catalyst can be maintained. In this invention, when preparing the support, support materials made from silica and alumina are first calcined in an oxidative atmosphere, then treated in a solution of nitrate or acetate of a metal selected from period 4 and lanthanides. After this treatment, it is again calcined under the reductive atmosphere. Here the treatment is a well-known method in the prior art, such as impregnation. The support can also be treated by a solution of nitrates or acetates of two or more metals.

In the preparation method according to the present invention, a coordination agent such as citric acid is added into the mixed solution to make the solution stable and allow the active components to adhere on the support uniformly. While in the prior art it is generally admitted that the safety can not be guaranteed if citric acid is used in the catalyst preparation technique.

It is to be noted that the existing form of the active components in bifunctional catalyst containing multimetal oxides is metal oxide, not the composite oxides such as $ABO_2$, $ABO_3$, $AB_2O_4$, etc. The active components are distributed uniformly and adhere firmly in the form of metal oxides on the outer and/or inner surface of support. So the prepared bifunctional catalyst is a kind of supported catalyst.

In principle, composites of various metal oxides in any ratio and in agreement with the above demands can be used as active components. The best combinations should be selected according to different reaction requirements.

The final product is obtained after the support is impregnated, dynamically dried by the technique in the prior art, such as activation at 200°–800° C. for 1–4 hours.

Further detailed explanation of this invention will be given through the following examples which do not limit this invention. All the agents in this invention are commercial products.

BEST MODE FOR CARRYING OUT THE INVENTION

EXAMPLE 1

Combustion-assistant catalyst for the regeneration of fluidized catalytic cracking catalyst in petroleum refining 1) The microspheric powder support was prepared by spray drying of the mixture of aluminum hydroxide and kaolin in a weight ratio $Al_2O_3$: $SiO_2$=1:1.8 into microspheric powders, calcining at 1400° C. for 4 hours in an oxidative atmosphere, impregnating in the solution of cobalt nitrate (0.5M) and calcinating at 1000° C. for another 2 hours in a reductive atmosphere.

2) Impregnant was prepared by mixing 400 ml of 2M manganese nitrate, 400 ml of 2M cobalt nitrate and 200 ml of 2M cerium nitrate to form a solution in which the metal ions are in a molar ratio 1:1:0.5, then adding 105 g citric acid to the mixed solution.

3) The combustion-assistant catalyst was prepared by impregnating 100 g microspheric powder in 60 ml impregnant prepared as above for 0.5 hour at normal pressure, dynamically drying at 100° C. and activating at 300° C. for 2.5 hours.

EXAMPLE 2

Catalyst for cleaning the exhaust from gasoline engine 1) $Al(OH)_3$ and kaolin were mixed in the weight ratio $SiO_2$:$Al_2O_3$=1:1.6. The mixture was extruded mechanically into strips, cut and shaped into the spheres. The support was prepared by repeating step 1) of example 1 except that cobalt nitrate solution was replaced with 0.5M copper nitrate solution.

2) Impregnant solution was prepared by mixing 435 ml of 2M copper nitrate, 435 ml of 2M chromium nitrate and 130 ml of 2M cerium nitrate to form a solution in which the metal ions were in a molar ratio of 1:1:0.3 and adding 105 g citric acid to the mixed solution.

3) Catalyst for cleaning the exhaust from gasoline engine was prepared by impregnating 100 g spherical support under vacuum in the impregnant (80 ml) for 0.5 hr, drying at 100° C. and then, activating at 300° C. for 3 hours.

EXAMPLE 3

Catalyst for cleaning the exhaust from automobiles 40 ml of 2M copper nitrate and 40 ml of 2M chromium nitrate were mixed to form a solution in which the metal ions were in a molar ratio of 1:1. The impregnant was prepared by adding 8.5 g citric acid to the mixed solution. 100 g spherical support used in example 2 was impregnated in the prepared impregnant under vacuum for 0.4 hour, dried at 100° C. and activated at 250° C. for 4 hours. The catalyst which can be used for cleaning auto exhaust was obtained.

EXAMPLE 4

Catalyst for cleaning the exhaust from automobiles 15 ml of 2M copper nitrate and 30 ml of 2M chromium nitrate were mixed to form a solution in which the metal ions were in a molar ratio of 1:2. Impregnant was prepared by adding 5 g citric acid to the mixed solution. 50 g spherical support used in example 2 was impregnated in the prepared impregnant under vacuum for 0.4 hour, dried at 100° C. and activated at 320° C. for 2.5 hours. The catalyst which can be used for cleaning auto exhaust was obtained.

EXAMPLE 5

Catalyst for cleaning the exhaust from automobiles 4 ml of 2M nickel nitrate, 23 ml of 2M cobalt nitrate, 24 ml of 2M cerium nitrate and 30 ml of 2M chromium nitrate were mixed to form a solution in which the metal ions were in a molar ratio of 0.5:2.9:3:3.8. Impregnant was prepared by adding 8 g citric acid to the mixed solution. 100 g spherical support used in example 2 was impregnated in the prepared impregnant under vacuum for 0.7 hour, dried at 100° C. and activated at 350° C. for 2 hours. The catalyst which can be used for cleaning auto exhaust was obtained.

EXAMPLE 6

Catalyst for cleaning the exhaust from automobiles 12 ml of 2M iron nitrate, 19 ml of 2M copper nitrate, 25 ml of 2M cobalt nitrate, 28 ml of 2M cerium nitrate and 37 ml of 2M chromium nitrate were mixed to form a solution in which the metal ions were in a molar ratio of 1.3:2:2.7:3:4. Impregnant was prepared by adding 13 g citric acid to the mixed solution. 150 g spherical support used in example 2 was impregnated in the prepared impregnant under vacuum for 0.7 hour, dried at 100° C. and activated at 320° C. for 2.5 hours. The catalyst which can be used for cleaning auto exhaust was obtained.

EXAMPLE 7

Catalyst for cleaning the exhaust from automobiles 12 ml of 2M nickel nitrate, 25 ml of 2M manganese nitrate, 28 ml of 2M Copper nitrate, 37 ml of 2M cerium nitrate and 58 ml of 2M cobalt nitrate were mixed to form a solution in which the metal ions were in a molar ratio of 1:2:2.3:3:4.7. Impregnant was prepared by adding 16 g citric acid to the mixed solution. 200 g spherical support used in example 2 was impregnated in the impregnant under vacuum for 0.5 hour, dried at 100° C. and activated at 280° C. for 3.5 hours. The catalyst which can be used for cleaning auto exhaust was obtained.

EXAMPLE 8

Catalyst for cleaning the exhaust from automobiles 9 ml of 2M nickel nitrate, 18 ml of 2M cobalt nitrate, 21 ml of 2M copper nitrate, 28 ml of 2M cerium nitrate and 43 ml of 2M manganese nitrate were mixed to form a solution in which the metal ions were in a molar ratio of 1:2:2.3:3:4.7. Impregnant was prepared by adding 13 g citric acid to the mixed solution. 150 g spherical support used in example 2 was impregnated in the prepared impregnant under vacuum for 0.7 hour, dried at 100° C. and activated at 250° C. for 4 hours. The catalyst which can be used for cleaning auto exhaust was obtained.

EXAMPLE 9

Catalyst for cleaning the exhaust from automobiles 6 ml of 2M nickel nitrate, 52 ml of 2M cobalt nitrate, 14 ml of 2M copper nitrate, 19 ml of 2M cerium nitrate and 29 ml of 2M chromium nitrate were mixed to form a solution in which the metal ions were in a molar ratio of 1:2:3:2.3:4.7. Impregnant was prepared by adding 9 g citric acid to the mixed solution. 100 g spherical support used in example 2 was impregnated in the prepared impregnant under vacuum for 0.5 hour, dried at 100° C. and activated at 300° C. for 2.5 hours. The catalyst which can be used for cleaning auto exhaust was obtained.

EXAMPLE 10

Combustion-assistant catalyst for catalyst regeneration in fluidized catalytic cracking in petroleum refining 25 ml of 2M cobalt acetate, 25 ml of 2M maganese acetate, and 10 ml of 0.2M lanthanum acetate were mixed to form a solution in which the metal ions were in a molar ratio of 1:1:0.04. Impregnant was prepared by adding 4 g citric acid to the mixed solution. 100 g spherical support used in example 1 was impregnated in the prepared impregnant at normal pressure for 0.5 hour, dynamically dried at 100° C. and activated at 300° C. for 2 hours. The combustion-assistant catalyst was obtained.

INDUSTRIAL APPLICABILITY

By adopting the above technical schemes the catalyst according to the present invention can completely oxidize various organic compounds such as CO, alkanes, alkenes and aromatic hydrocarbons under adequate conditions. So it is suitable for petroleum refining, industrial waste gas treatment and gas cleaning of special requirements. It can completely decompose the oxides of nitrogen and sulfur; treat the gases containing nitrogen oxide and sulfur oxide; promote the complete oxidation of CO and hydrocarbons and at the same time promote the complete reduction of nitrogen oxides. The catalyst of this invention is especially suitable for cleaning the exhaust from gasoline engines. On the other hand, the catalyst of this invention can replace the catalyst containing nobel metals as active components, such as platinum, rhodium, ruthenium and palladium etc., and show more perfect catalytic performances than nobel metal catalysts.

The following experimental examples will explain the industrial applicability.

EXPERIMENT 1

5 g combustion-assistant catalyst prepared in example 1 was diluted 10 times and put into a small fixed fluidized bed. The composition of the reaction gas was 3% $O_2$, 4% CO with $N_2$ remained. When the reaction was conducted at 300° C. (catalyst bed temperature) and a space velocity of 5000 $hr^{-1}$ (volume), CO conversion was 100%.

CO conversion on the commercial Pt catalyst under the same conditions was less than 20%.

EXPERIMENT 2

30 g catalyst prepared in preparation example 2 was put into a Φ 30 m/m reactor. The composition of the reaction gas was 3% CO, 1500 ppm hydrocarbons, 500 ppm $NO_x$, 1.5% $O_2$, with $N_2$ remained. Under conditions of a space velocity (volume) 20000 $hr^{-1}$, reaction temperature (catalyst bed temperature) 250° C., CO conversion was higher than 95%, hydrocarbon conversion was higher than 70%, NOx conversion was higher than 70%.

In Japan, conversions of CO, hydrocarbons and $NO_x$ of a promising catalyst for commercialization are considered to exceed 50% under the above reaction conditions.

EXPERIMENT 3

30 g catalyst prepared in example 2 was put into a Φ 30 m/m reactor. The reaction gas was composed of 1% CO, 100 ppm hydrocarbons, 2000 ppm $NO_x$, 0.5% $O_2$ with $N_2$ remained. Under conditions of a space velocity (volume) 20000 $hr^{-1}$ and reaction temperature (catalyst bed temperature) 650° C., CO conversion was higher than 95%, hydrocarbon conversion was higher than 75%, the $NO_x$ conversion was 75%.

What is claimed is:

1. A method for preparing a bifunctional catalyst containing multimetal oxides comprising the following steps:

1) mixing silica and alumina used as support in a weight ratio of 1:1.2–2.5, moulding and calcining at 1000° C.–1600° C. for 2–8 hours in an oxidative atmosphere;

2) treating the above calcined support in a 0.3–2M solution by a nitrate or acetate of a metal element selected from transition metals of period 4 of the periodic table and lanthanides;

3) calcining the support after treatment in step 2) at 700°–1200° C. for 1–4 hours in a reductive atmosphere;

4) mixing nitrates or acetates of at least two metal elements selected from transition metals in period 4 of the periodic table and lanthanides to form a solution in which the total concentration of metal ions is 1–2.5M, and adding one coordination agent selected from oxalic acid, amino acetic acid, 2-hydroxy-propanoic acid, succinic acid, hydroxy-butanedioic acid, tartaric acid, citric acid, o-phthalic acid, o-amino-benzoic acid and salicylaldoxime into the mixed solution in an amount of the coordination agent being ¼–¾ of the concentration of the metal ions;

5) impregnating the support treated in step 3) in the impregnant prepared in step 4), then drying and activating at a temperature around 300° C. to obtain said bifunctional catalyst containing multimetal oxides.

2. A method as described in claim 1, wherein said transition metal elements in period 4 of the periodic table and lanthanides are selected from a group consisting of chromium, manganese, iron, copper, cobalt, nickel, zinc, vanadium, titanium, lanthanum and cerium.

3. A method as described in claim 1, wherein the support is moulded into a shape of microspheric powders with particle size of 60–100 μm or in the shape of cylinder, ring, sphere, plate with particle diameter of 3–5 mm or honeycomb.

4. A method as described in claim 1, wherein the solution of nitrates or acetates of at least two elements selected from transition metals of period 4 of the periodic table and lanthanides is the mixed solution of manganese nitrate, cobalt nitrate and cerium nitrate with a molar ratio of the metal ions being 1:1:0.3–0.5 and the total concentration of the metal ions in this mixed solution being 1–2.5M.

5. A method as described in claim 1, wherein the solution of nitrates or acetates of at least two elements selected from transition metals of period 4 and lanthanides is the mixed solution of copper nitrate, chromium nitrate and cerium nitrate with a molar ratio of the metal ions being 1:1:0.3–0.5 and the total concentration of the metal ions in this mixed solution being 1–2.5M.

6. A method as described in claim 1, wherein the solution of nitrates or acetates of at least two elements selected from transition metals of period 4 of the periodic table and lanthanides is the mixed solution of copper nitrate, and chromium nitrate with a molar ratio of the metal ions being 1:1–2 and the total concentration of the metal ions in this mixed solution being 1–2.5M.

7. A method as described in claim 1, wherein the solution of nitrates or acetates of at least two elements selected from transition metals of period 4 of the periodic table and lanthanides is the mixed solution of nickel nitrate, cobalt nitrate, cerium nitrate and chromium nitrate with a molar ratio of the metal ions being 0.5:2.9:3:3.8 and the total concentration of the metal ions in this mixed solution being 1–2.5M.

8. A method as described in claim 1, wherein the solution of nitrates or acetates of at least two elements selected from transition metals of period 4 of the periodic table and lanthanides is the mixed solution of iron nitrate, copper nitrate, cobalt nitrate, cerium nitrate and chromium nitrate with s molar ratio of the metal ions being 1.3:2:2.7:3:4 and the total concentration of the metal ions in this mixed solution being 1–2.5M.

9. A method as described in claim 1, wherein the solution of nitrates or acetates of at least two elements selected from transition metals of period 4 of the periodic table and lanthanides is the mixed solution of nickel nitrate, manganese nitrate, copper nitrate, cerium nitrate and cobalt nitrate with a molar ratio of the metal ions being 1:2–4.7:2.3:3:2–4.7 and the total concentration of the metal ions in this mixed solution being 1–2.5M.

10. A method as described in claim 1, wherein the solution of nitrates or acetates of at least two elements selected from transition metals of period 4 of the periodic table and lanthanides is the mixed solution of nickel nitrate, cobalt nitrate, copper nitrate, cerium nitrate and chromium nitrate with a molar ratio of the metal ions being 1:2:2.3:3:4.7 and the total concentration of the metal ions in this mixed solution being 1–2.5M.

11. A method as described in claim 6, wherein the solution of nitrates or acetates of at least two elements selected from transition metals of period 4 of the periodic table and lanthanides is the mixed solution of cobalt acetate, manganese acetate and lanthanum acetate with a molar ratio of the metal ions being 1:1:0.04 and the total concentration of the metal ions in this mixed solution being 1–2.5M.

12. A method as described in claim 1, wherein the coordination agent is citric acid.

13. A method as described in claim 1, wherein the impregnation in step 5) can be conducted at normal pressure or vacuum.

14. A method as described in claim 1, wherein the nitrate or acetate solution contains 2–5 elements selected from transition metal elements of period 4 of the periodic table and lanthanides.

15. A catalyst prepared by the method as described in any one of claims 1–14.

* * * * *